(12) United States Patent
Kudo et al.

(10) Patent No.: US 12,020,316 B2
(45) Date of Patent: Jun. 25, 2024

(54) POWER TRADING SYSTEM, COMPUTER, AND POWER TRADING METHOD

(71) Applicant: TOYOTA JIDOSHA KABUSHIKI KAISHA, Toyota (JP)

(72) Inventors: Yuki Kudo, Susono (JP); Kazutaka Kimura, Mishima (JP); Kazuki Obata, Susono (JP); Hiromitsu Kigure, Ashigarakami-gun (JP); Satoshi Kikuchi, Hadano (JP); Yuta Maniwa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/938,189

(22) Filed: Oct. 5, 2022

(65) Prior Publication Data

US 2023/0120979 A1 Apr. 20, 2023

(51) Int. Cl.
*G06Q 30/08* (2012.01)
*G06Q 50/06* (2024.01)
(52) U.S. Cl.
CPC ............. *G06Q 30/08* (2013.01); *G06Q 50/06* (2013.01)
(58) Field of Classification Search
CPC ................................ G06Q 30/08; G06Q 50/06
See application file for complete search history.

(56) References Cited

U.S. PATENT DOCUMENTS

| 2018/0204293 | A1* | 7/2018 | Bazhinov | ............... G05B 15/02 |
| 2020/0242491 | A1* | 7/2020 | To | ............... G06N 5/04 |
| 2020/0298721 | A1* | 9/2020 | Hishida | ............... B60L 53/60 |
| 2020/0386814 | A1* | 12/2020 | Fogarty | ............... H01M 10/44 |
| 2022/0237695 | A1* | 7/2022 | Hwang | ............... G06Q 20/3827 |

FOREIGN PATENT DOCUMENTS

JP 2020-9334 A 1/2020

* cited by examiner

*Primary Examiner* — Scott C Anderson
(74) *Attorney, Agent, or Firm* — Oblon, McClelland, Maier & Neustadt, L.L.P.

(57) ABSTRACT

A power trading system includes a power trading platform (a power trading computer) and a vehicle agent (a bidding computer) that places a bid on the power trading platform. The vehicle agent includes a bidding unit and a generation unit. The bidding unit places a bid for power trading by transmitting bid data in a predetermined format to the power trading computer. The generation unit transcribes transcribed information included in the bid data for a contracted bid and generates the bid data for a cancellation bid so as to cancel the contracted bid. The transcribed information includes attribute information indicating an attribute of electric power related to power trading.

10 Claims, 10 Drawing Sheets

FIG. 9

BID TO BE CANCELED — T12

<CONTRACTED BID>

BIDDER ID: 12345 — TRANSCRIBE →

BID ID: ABC

PERIOD: 1:00 PM TO 1:30 PM — TRANSCRIBE →

PURCHASE

ELECTRIC ENERGY: 3 kWh

PRICE: 24 YEN

ATTRIBUTE: SOLAR — TRANSCRIBE →

INFO: COUPON Z5 — TRANSCRIBE →

BID TO CANCEL — T22

<CONTRACTED BID>

BIDDER ID: 12345

PERIOD: 1:00 PM TO 1:30 PM

SELL

ELECTRIC ENERGY: 2.5 kWh

PRICE: 10 YEN

ATTRIBUTE: SOLAR

INFO: COUPON Z5
RESALE ABC

TRANSCRIBE

FIG. 10

BID TO BE CANCELED — T13

<CONTRACTED BID>

BIDDER ID: 12345 — TRANSCRIBE →

BID ID: ABC

PERIOD: 1:00 PM TO 1:30 PM — TRANSCRIBE →

SELL

ELECTRIC ENERGY: 3 kWh

PRICE: 14 YEN

ATTRIBUTE: WIND — TRANSCRIBE →

INFO: -

BID TO CANCEL — T23

<CONTRACTED BID>

BIDDER ID: 12345

PERIOD: 1:00 PM TO 1:30 PM

PURCHASE

ELECTRIC ENERGY: 3 kWh

PRICE: 28 YEN

ATTRIBUTE: WIND

INFO: REPURCHASE ABC

TRANSCRIBE

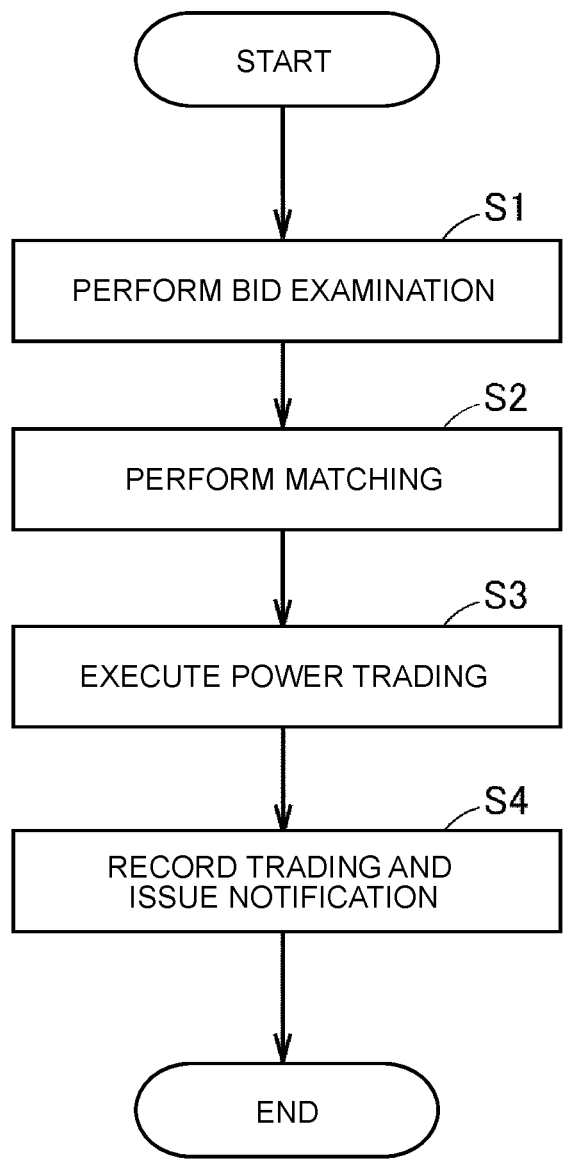

POWER TRADING SYSTEM, COMPUTER, AND POWER TRADING METHOD

CROSS-REFERENCE TO RELATED APPLICATION

This application claims priority to Japanese Patent Application No. 2021-170752 filed on Oct. 19, 2021, incorporated herein by reference in its entirety.

BACKGROUND

1. Technical Field

The present disclosure relates to a power trading system, a computer, and a power trading method.

2. Description of Related Art

For example, Japanese Unexamined Patent Application Publication No. 2020-9334 (JP 2020-9334 A) discloses a power trading platform on which each member can purchase and sell electric power.

SUMMARY

In recent years, a power trading system that tracks attributes of electric power using a blockchain technology has been known. However, in such a system, the attributes of electric power are not tracked when a cancellation bid is placed to cancel a contracted bid. Therefore, depending on the electric power involved in the power trading, the added value (for example, the environmental value) results in being lost.

The present disclosure has been made to solve the above issue, and an object of the present disclosure is to provide a power trading system, a computer, and a power trading method capable of tracking attributes of electric power when a cancellation bid is placed to cancel a contracted bid.

A power trading system according to a first aspect of the present disclosure includes a power trading computer and a bidding computer that places a bid on the power trading computer. The bidding computer includes a bidding unit and a generation unit. The bidding unit is configured to place a bid for power trading by transmitting bid data in a predetermined format to the power trading computer. The generation unit is configured to transcribe predetermined information included in the bid data for a contracted bid and generate the bid data for a cancellation bid so as to cancel the contracted bid. The predetermined information above includes attribute information indicating an attribute of electric power related to power trading. Hereinafter, the above-mentioned predetermined information will be also referred to as "transcribed information".

In the power trading system, the attribute information included in the bid data for the contracted bid is transcribed to the bid data for the cancellation bid. Therefore, when the cancellation bid is placed to cancel the contracted bid, the attribute of electric power can be tracked.

The bid data in the predetermined format above may include a bid price and a bid electric energy; and The generation unit may be configured to generate the bid data for the cancellation bid such that the bid electric energy of the cancellation bid does not exceed the bid electric energy of the contracted bid.

The configuration above suppresses the bid electric energy of the cancellation bid from exceeding the bid electric energy of the contracted bid (that is, the upper limit of the bid electric energy that can be canceled). Therefore, it becomes easy to generate appropriate bid data for the cancellation bid.

The contracted bid may be a purchase bid, and the cancellation bid may be a sell bid. The generation unit may be configured to generate the bid data for the cancellation bid such that the bid price of the cancellation bid is lower than the bid price of the contracted bid.

According to the above configuration, resale is executed at a price lower than the price at the time of purchase. This facilitates successful resale.

The contracted bid may be a sell bid, and the cancellation bid may be a purchase bid. The generation unit may be configured to generate the bid data for the cancellation bid such that the bid price of the cancellation bid is higher than the bid price of the contracted bid.

According to the above configuration, repurchase is executed at a price higher than the price at the time of sale. This facilitates a successful repurchase.

The transcribed information may further include identification information of the contracted bid, identification information of a bidder, and a power delivery period.

Transcription of the above information in addition to the attribute information to the bid data for the cancellation bid makes it easier for the power trading computer to appropriately conduct the bid examination.

The generation unit may be configured to generate the bid data for the cancellation bid so as to eliminate an imbalance in a balancing. With such a configuration, it becomes easier to eliminate the imbalance by the cancellation bid. The imbalance in the balancing corresponds to, for example, a difference between the planned supply and demand value and the actual supply and demand value (actual supply and demand).

The power trading computer may be configured to conduct an examination as to whether to accept the bid when the bid data is acquired from the bidding computer. The power trading computer may be configured to accept the bid when the acquired bid data satisfies a predetermined requirement in the examination related to the cancellation bid. The predetermined requirement includes matching between a bidder of the contracted bid and a bidder of the cancellation bid. Hereinafter, the above-mentioned predetermined requirement will be also referred to as a "bid requirement".

According to the above configuration, it becomes easy to eliminate fraudulent cancellation bids (resale or repurchase) by anyone other than the person concerned (the bidder of the contracted bid).

The predetermined requirement further includes that the power delivery period matches between the contracted bid and the cancellation bid, and a bid electric energy of the cancellation bid does not exceed a bid electric energy of the contracted bid.

According to the above configuration, it becomes easy to eliminate cancellation bids (resale or repurchase) that exceed the contract range.

Note that, the bid requirement can be set arbitrarily. The bid requirement may further include that the cancellation bid is not prohibited with respect to the contracted bid.

A computer according to a second aspect of the present disclosure is configured to place a bid for power trading. The computer includes a bidding unit and a generation unit. The bidding unit is configured to place the bid for power trading by transmitting bid data in a predetermined format. The generation unit is configured to transcribe predetermined information included in the bid data for a contracted bid and generate the bid data for a cancellation bid so as to cancel the contracted bid. The predetermined information above includes attribute information indicating an attribute of electric power related to power trading.

Similar to the power trading system described above, the computer above also makes it possible to track the attribute of electric power when the cancellation bid is placed to cancel the contracted bid.

A power trading method according to a third aspect of the present disclosure includes data generation and placement of a cancellation bid. In the data generation, predetermined information included in bid data for a contracted bid is transcribed and bid data for a cancellation bid so as to cancel the contracted bid is generated. In the placement of the cancellation bid, a bid for power trading is placed by transmitting the bid data for the cancellation bid. The predetermined information above includes attribute information indicating an attribute of electric power related to power trading.

Similar to the power trading system described above, the power trading method above also makes it possible to track the attribute of electric power when the cancellation bid is placed to cancel the contracted bid.

According to the present disclosure, it becomes possible to provide a power trading system, a computer, and a power trading method capable of tracking the attribute of electric power when a cancellation bid is placed so as to cancel a contracted bid.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a diagram showing a first modification of a contracted bid tag and a cancellation bid tag shown in FIG. 8;

FIG. 10 is a diagram showing a second modification of the contracted bid tag and the cancellation bid tag shown in FIG. 8;

FIG. 11 is a flowchart showing a process related to power trading executed by a power trading platform (power trading computer) according to the embodiment of the present disclosure.

DETAILED DESCRIPTION OF EMBODIMENTS

Figure 1:
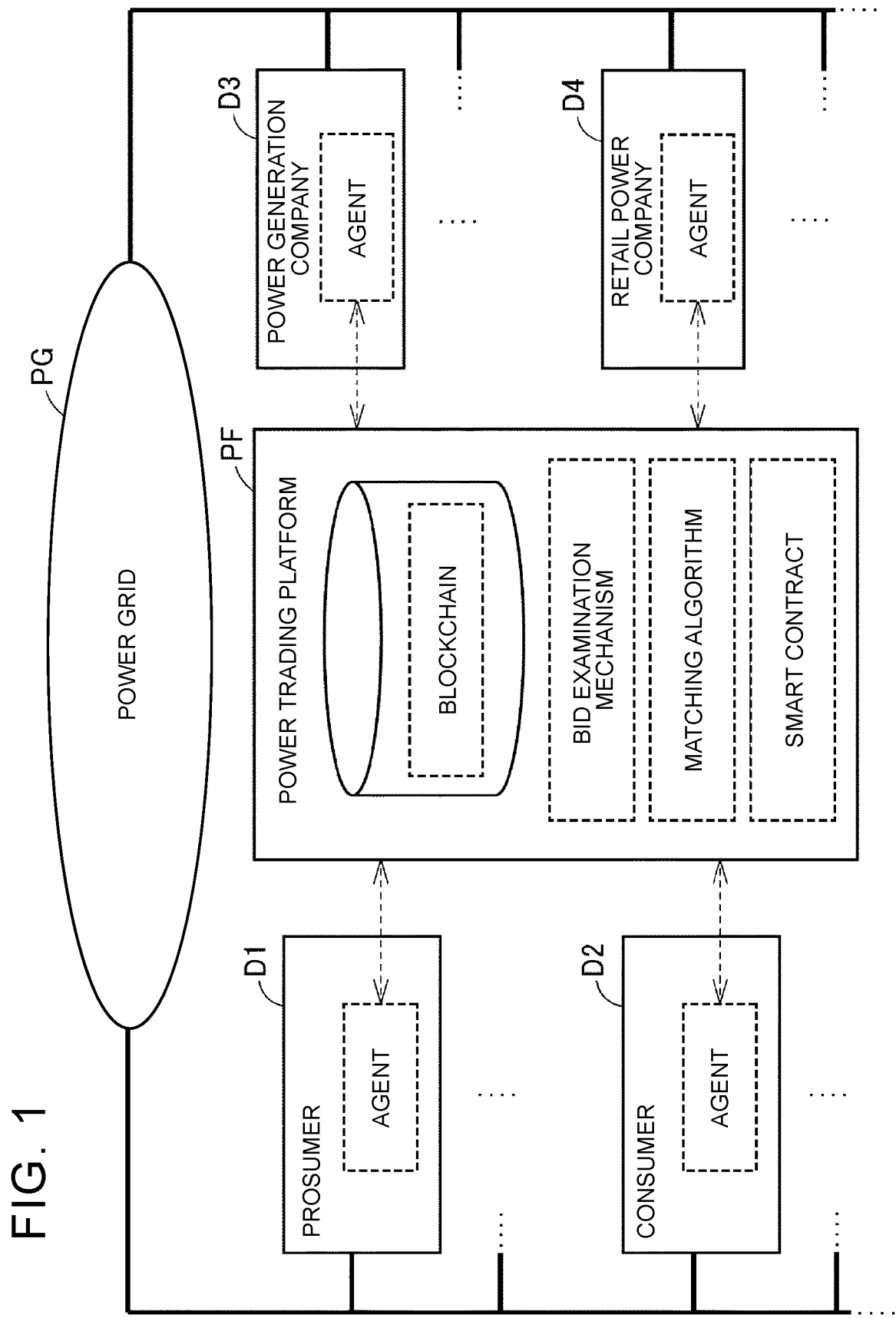
FIG. 1 is a diagram illustrating an outline of a power trading system according to an embodiment of the present disclosure.

An embodiment of the present disclosure will be described in detail with reference to the drawings. In the drawings, the same or corresponding parts are denoted by the same reference signs and the description thereof will not be repeated.

FIG. 1 is a diagram illustrating an outline of a power trading system according to the embodiment of the present disclosure. With reference to FIG. 1, a power trading platform PF according to the present embodiment is a peer-to-peer (P2P) power trading platform. For example, an aggregator uses the power trading platform PF to operate the power trading market. The power trading platform PF enables power trading between individuals. The power trading platform PF includes a blockchain ledger, a bid examination mechanism, a matching mechanism, and a smart contract. The power trading platform PF is embodied by a program stored in a storage device, a server running a program (an operating system, etc.), and a P2P network connecting the server and a group of computers (nodes) to each other. In the present embodiment, the server running the program on the power trading platform PF corresponds to an example of a "power trading computer" according to the present disclosure.

A user of the power trading platform PF purchases and sells the electric power transmitted and distributed through a power grid PG. The power grid PG is connected to a large number of power generation facilities and power storage facilities (not shown) owned by various power companies, in addition to power generation facilities and power storage facilities (not shown) installed in various buildings. The supply and demand balance of the power grid PG is adjusted such that balancing is achieved. An aggregator corresponds to a balance responsible party (BRP). Each user of the power trading platform PF owns resources that can be electrically connected to the power grid PG.

The user of the power trading platform PF is registered in the power trading platform PF in advance. In the present embodiment, a plurality of prosumers D1, a plurality of consumers D2, a plurality of power generation companies D3, and a plurality of retail power companies D4 are registered in the power trading platform PF. The number of users registered in the power trading platform PF is arbitrary, and may be five or more and less than 100, or may be 100 or more.

Each registered user owns an asset and an agent. In the present embodiment, the resources owned by each user function as assets. The agent has a function of placing a bid on the power trading platform PF. This makes it possible to purchase and sell electric power on an individual basis. After the contract, the resource outputs the electric power sold by the user to the power grid PG, or receives the electric power purchased by the user from the power grid PG.

A power meter is provided between the power grid PG and the resource. The power meter measures at least one of electric energy output by the resource to the power grid PG (reverse power flow) and electric energy received by the resource from the power grid PG. The power meter sequentially transmits the measured value to the power trading platform PF. The measured value of the power meter may be transmitted to the power trading platform PF via an energy management system (EMS). The power meter may be a smart meter that measures daily demand power (the electric energy used by the user), or may be a dedicated terminal introduced for power trading. The power meter may be provided for each resource, or one power meter (common power meter) may be provided for a plurality of resources. The EMS in the prosumer D1 may be configured to manage the generated power and the demand power.

Hereinafter, the power trading executed through the power trading platform PF will be described by taking the case where the prosumer D1 sells the electric power to the consumer D2 as an example.

First, the aggregator purchases a token from an exchange (not shown). This token will be used as a fee to fulfill the smart contract. Then, a node (agent) of the prosumer D1 places a sell bid (price offer), and a node (agent) of the consumer D2 places a purchase bid (price request). When both bids are placed on the power trading platform PF, the bid examination mechanism executes an examination (bid examination) as to whether the bid is appropriate. The bid examination mechanism conducts the bid examination in accordance with a predetermined algorithm. Then, when both bids pass the bid examination, the matching mechanism performs matching between the sell bid and the purchase bid after the funds validation. The matching mechanism performs matching in accordance with a predetermined algorithm.

The agent of the user (bidder) places an bid for power trading by transmitting bid data (hereinafter referred to as a "tag") in a predetermined format to the power trading platform PF (power trading computer). The tag presents the price and the electric energy (kWh). The bidder can place a bid with additional information attached by tags.

Figure 2:
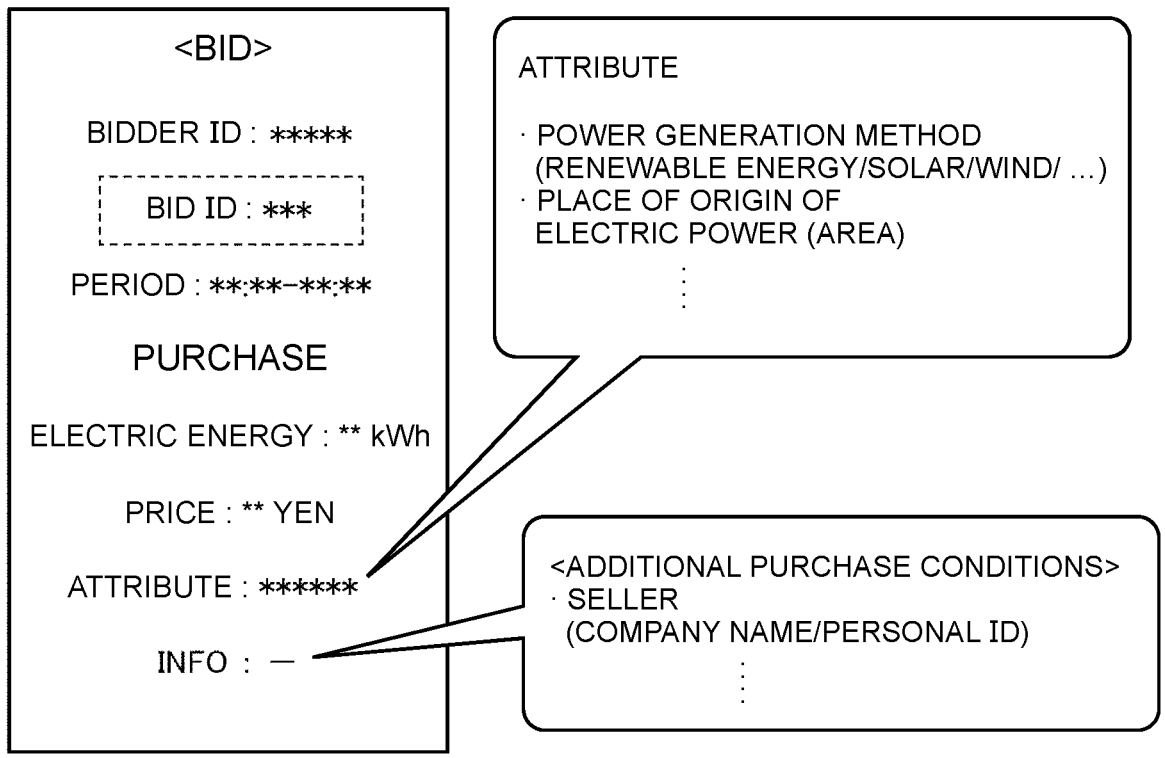
FIG. 2 is a diagram showing an example of a purchase bid tag.

FIG. 2 is a diagram showing an example of a purchase bid tag. With reference to FIG. 2, the tag contains a bidder ID (identification information of the bidder), a power delivery period, a bid price, a bid electric energy (kWh), attribute information, and additional bid information (hereinafter referred to as "INFO").

The attribute information of the purchase bid tag indicates the attribute of the electric power related to the purchase bid. The agent of the purchasing bidder (for example, the consumer D2) can describe the attributes of the electric power (a power generation method, a place of origin, etc.) that the bidder desires to purchase in the purchase bid tag. Examples of the power generation method include renewable energy in general, specific renewable energy (solar power generation, wind power generation, geothermal power generation, biomass power generation, etc.), and thermal power generation. The place of origin of electric power may be an area designated by the name of a prefecture, or may be an area designated by longitude and latitude. An area on the map arbitrarily specified by the user using the pointing device may be described in the tag. The agent of the purchasing bidder can purchase the electric power desired by the bidder by describing the purchase condition related to the attributes of electric power in the purchase bid tag. It is possible to purchase electric power with high environmental value by designating renewable energy in the power generation method. When the local area is designated as the place of origin, local production for local consumption becomes possible.

The INFO of the purchase bid tag is information indicating special notes related to the purchase bid. The agent of the purchasing bidder can list the conditions for the trading partner in the INFO. The trading partner may be specified by a company name or a personal ID. Specification of the consignment source with the personal ID makes self-consignment possible. The agent of the purchase bidder can specify the purchase conditions in detail by the INFO of the tag.

The bidding ID is assigned by the power trading platform PF, not by the agent of the bidder. Specifically, when the bid examination mechanism acquires the above tag from the bidder, the bid examination mechanism executes a bid examination (examination of whether to accept the bid). Then, a bid ID (bid identification information) is assigned to the tag of the bid that has passed the bid examination by the bid examination mechanism. This also applies to a sell bid tag that will be described below.

Figure 3:
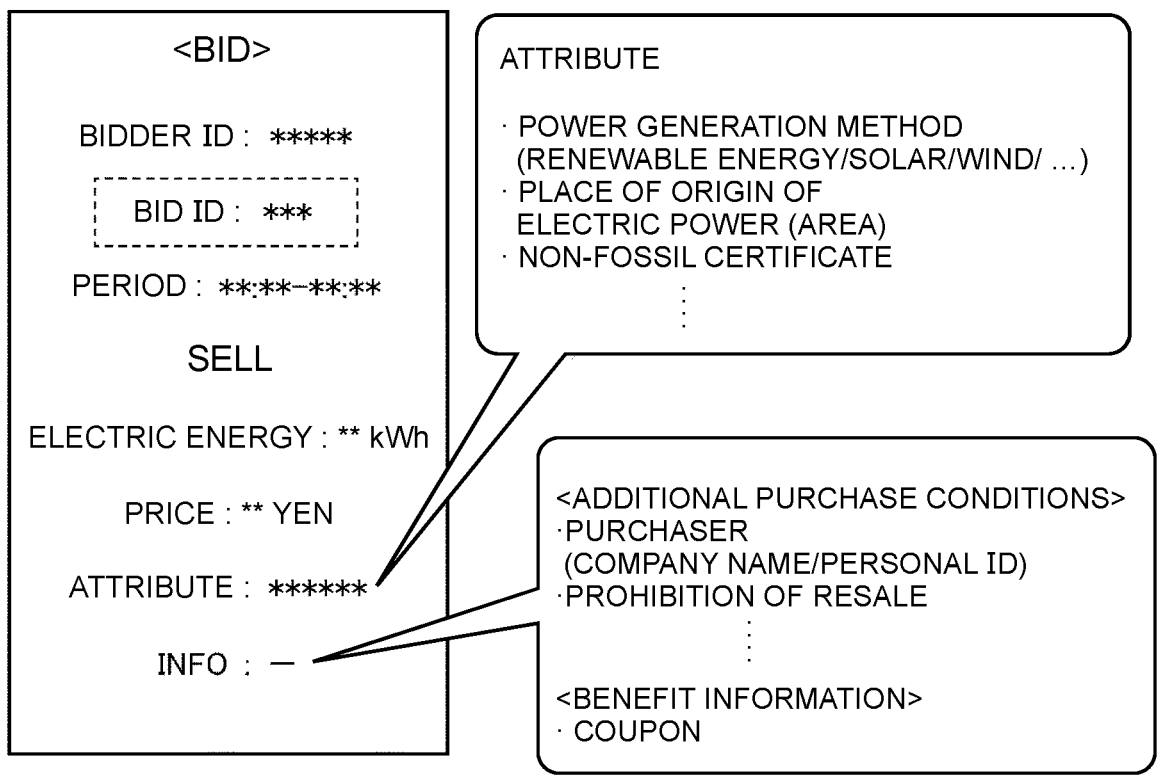
FIG. 3 is a diagram showing an example of a sell bid tag.

FIG. 3 is a diagram showing an example of the sell bid tag. With reference to FIG. 3, the tag contains the bidder ID (identification information of the bidder), the power delivery period, the bid price, the bid electric energy (kWh), the attribute information, and the INFO (additional bid information).

The attribute information of the purchase bid tag indicates the attribute of the electric power related to the sell bid. The agent of the selling bidder (for example, the prosumer D1) describes the attributes of the electric power to be sold (the power generation method, the place of origin, the certificate, etc.) in the tag of the sell bid. When the bidder sells electric power with a non-fossil certificate, the type of non-fossil certificate (for example, any of FIT non-fossil certificate with designation of renewable energy, non-FIT non-fossil certificate with designation of renewable energy, and non-FIT non-fossil certificate without designation of renewable energy) is described on the tag. Note that, the renewable energy means "renewable energy". FIT means "Feed-in Tariff".

The INFO of the sell bid tag is information indicating special notes related to the sell bid. The agent of the selling bidder can describe the conditions for the trading partner in the INFO. The trading partner may be specified by a company name or the personal ID. Specification of the consignment source with the personal ID makes self-consignment possible. Further, the agent of the selling bidder can state that resale is prohibited in the INFO as a sales condition for the trading partner. In addition, the agent of the selling bidder may include benefit information indicating benefits provided along with the power trading in the INFO. An example of the benefit is a coupon. The benefit information indicates the range of use (for example, region or store) and the value of use (for example, monetary value or service content) of the coupon. The coupon may be an electronic coupon. The agent of the selling bidder can inform the power trading platform PF of the sales conditions and the benefit information by the INFO of the tag.

With reference to FIG. 1 again, the matching mechanism takes into account additional information (the attribute information and the INFO) indicated by the tag in addition to the bid price, the bid electric energy, and the delivery period, and performs matching so as to satisfy the purchase conditions and the sales conditions indicated by the tag. When the matching between the prosumer D1 and the consumer D2 is successful, the consumer D2 pays the aggregator an electricity charge in legal tender (for example, JPY, USD, GBP, or EUR). After that, the aggregator deposits the above token on the power trading platform PF. The prosumer D1 supplies the electric energy (kWh) presented at the time of bidding to the power grid PG. The consumer D2 receives the electric energy (kWh) presented at the time of bidding from the power grid PG. The smart contract executes the power trading after proof of delivery. Specifically, the smart contract returns the deposited token to the aggregator and updates the blockchain ledger (for example, the local network ledger) that records the transaction. Transactions are recorded on each node.

When the power trading is executed by the smart contract, the aggregator pays the prosumer D1 the amount of legal tender corresponding to the trading result. Further, the aggregator also settles trading costs (consignation fees, platform costs, etc.).

The record of the blockchain ledger of the power trading platform PF is reflected in the ledger of an external platform (for example, the Ethereum ledger). The aggregator disposes of the first token purchased at the exchange after trading is completed in order to limit the amount of tokens distributed.

As described above, the aggregator plays a central role in trading tokens on the power trading platform PF, making payment of electricity charges, and making payment of consignation charges. Note that, the process by the aggregator is executed on a non-illustrated node (for example, a server belonging to the aggregator).

Figure 4:
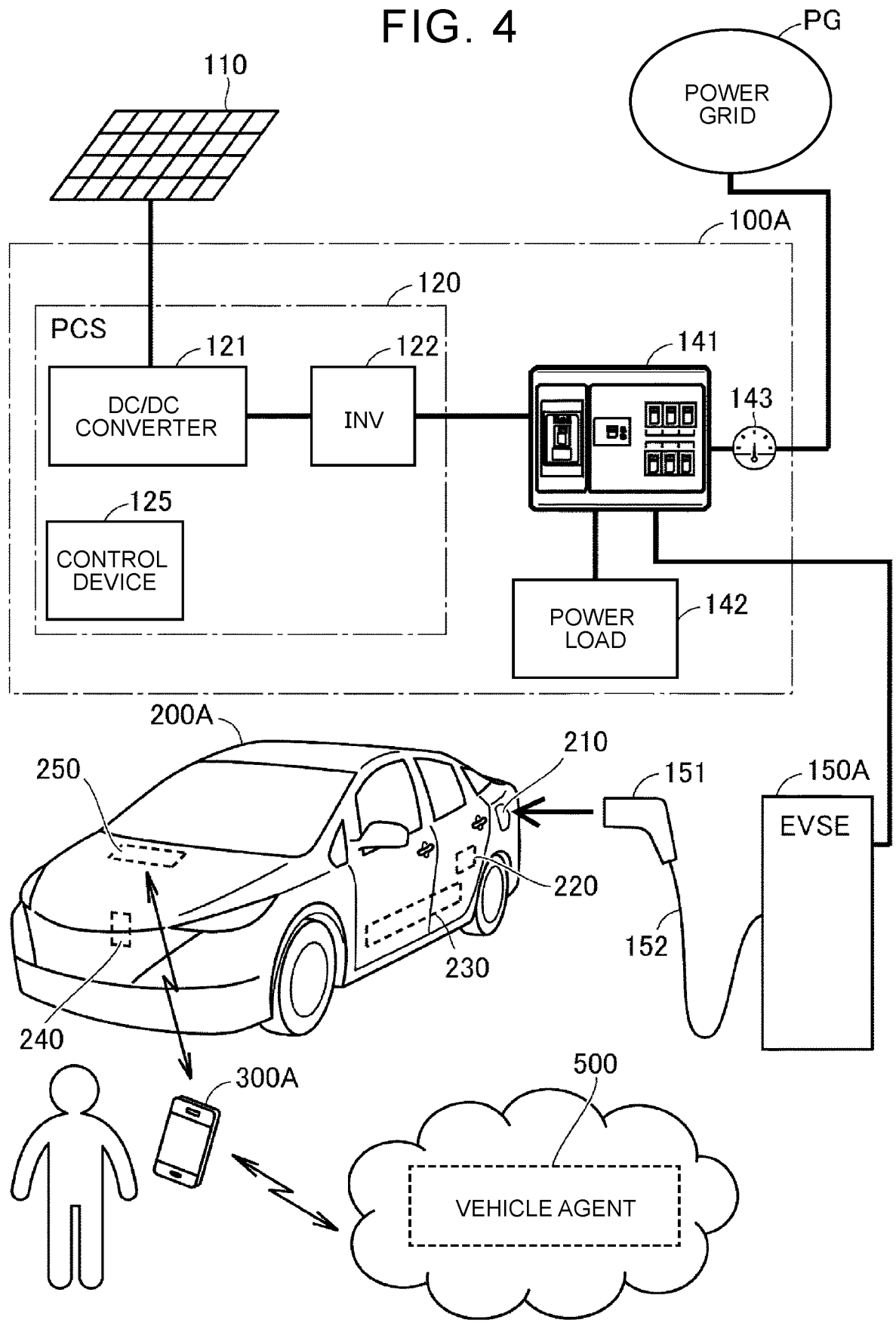
FIG. 4 is a diagram showing an example of a power facility of a prosumer shown in FIG. 1.

FIG. 4 is a diagram showing an example of a power facility of the prosumer D1. With reference to FIG. 4 together with FIG. 1, a solar panel 110 is installed on the roof of a house 100A of the prosumer D1. Inside the house 100A, a power conditioning system (PCS) 120, a distribution board 141, and a power load 142 are provided. Electric vehicle supply equipment (EVSE) 150A is installed on the premises (outdoors) of the home of the user. Further, a smart meter 143 is installed between the power grid PG and the distribution board 141.

The solar panel 110 uses sunlight for power generation. The solar panel 110 is a naturally fluctuating power source of which power generation output fluctuates depending on the weather conditions, and outputs the generated electric power to the PCS 120. The PCS 120 has a function of converting generated electric power into grid power (electric power of the power grid PG). The PCS 120 includes a direct current (DC)/DC converter 121, an inverter 122, and a control device 125. The control device 125 is configured to control each of the DC/DC converter 121 and the inverter 122 based on, for example, the electric power generated by the solar panel 110 and the power consumption (demand power) at the home of the user.

The DC/DC converter 121 transforms the DC power generated by the solar panel 110 into a voltage corresponding to the grid power. Then, the inverter 122 converts the DC power output from the DC/DC converter 121 into alternating current (AC) power corresponding to the grid power and outputs the AC power to the distribution board 141. The control device 125 can adjust the electric power input from the solar panel 110 to the distribution board 141 by controlling at least one of the DC/DC converter 121 and the inverter 122. The control device 125 may reverse power flow of the generated power of the solar panel 110 with respect to the power grid PG in accordance with an instruction from the user.

Electric power (for example, three-phase AC power) is supplied from each of the power grid PG and the solar panel 110 (the PCS 120) to the distribution board 141. The power load 142 is an electric device used indoors, and is supplied with electric power from the distribution board 141. The power load 142 may be connected to the distribution board 141 via an outlet (not shown). The power load 142 may be a household electric appliance such as a lighting fixture, an air conditioner, a cookware, an information device, a refrigerator, or a washing machine.

The EVSE 150A is equipment that supplies electric power to the vehicle, and receives electric power from the distribution board 141. The vehicle and the power grid PG are electrically connected to each other as a connector 151 of a charging cable 152 connected to the main body of the EVSE 150A is connected to (plugged in) the inlet of the vehicle. Hereinafter, a state in which the vehicle and the power grid PG are electrically connected to each other will be referred to as a "plug-in state". Further, a state in which the vehicle and the power grid PG are not electrically connected to each other will be referred to as a "plug-out state". The traveling vehicle is in the plug-out state.

A vehicle 200A is an xEV that can travel using the electric power stored in a power storage device. The xEV is a vehicle that uses electric power as all or part of a motive power source. Specifically, the vehicle 200A includes an inlet 210, a charger 220, a battery 230, a motor 240, and an electronic control unit (ECU) 250. The battery 230 is an energy storage device for traveling. As the battery 230, a known vehicle power storage device (for example, a liquid secondary battery, an all-solid-state secondary battery, or an assembled battery) can be adopted. Examples of a vehicle secondary battery include a lithium ion battery and a nickel-metal hydride battery. The vehicle 200A supplies electric power from the battery 230 to the motor 240 and travels by the power generated by the motor 240. The motor 240 may be a motor generator (MG). The vehicle 200A is, for example, a battery electric vehicle (BEV). However, the vehicle is not limited to this, and the vehicle included in the power facility of the prosumer D1 (FIG. 1) may be an xEV other than the BEV.

The vehicle 200A is configured to be electrically connectable to the power grid PG via the EVSE 150A. The inlet 210 is configured to be connectable to the connector 151 of the EVSE 150A. The charger 220 is located between the inlet 210 and the battery 230 and is controlled by the ECU 250. The charger 220 includes, for example, an inverter. When electric power is supplied from the power grid PG to the vehicle 200A in the plug-in state, the ECU 250 controls the charger 220 such that appropriate electric power is input from the inlet 210 to the battery 230.

The vehicle 200A has a vehicle to home (V2H) function. The vehicle 200A is configured to be able to supply the electric power of the battery 230 to the house 100A (more specifically, the distribution board 141) via the EVSE 150A in the plug-in state. Further, the vehicle 200A has a vehicle to grid (V2G) function (a function of bidirectionally exchanging electric power with the power grid PG). A discharge circuit (power conversion circuit for discharge) may be built in the charger 220, the inlet 210, or the connector 151, or may be built in a discharge connector that can be attached to both the inlet 210 and the connector 151. Note that, the vehicle included in the power facility of the prosumer D1 (FIG. 1) may be a V1G type xEV (xEV of a type that unilaterally receives electric power from the power grid PG). The function of the charger-discharger may be mounted on the EVSE instead of the vehicle.

The ECU 250 communicates with a mobile terminal 300A via a wireless communication device (not shown) mounted on the vehicle 200A. The mobile terminal 300A and the vehicle 200A perform short-range communication (that is, direct communication within a range around the vehicle) such as near field communication (NFC) or Bluetooth (registered trademark). The mobile terminal 300A is operated by the user. In the present embodiment, a smartphone equipped with a touch panel display is adopted as the mobile terminal 300A. However, the mobile terminal 300A is not limited to this, and any mobile terminal can be adopted, and a laptop, a tablet terminal, a wearable device (for example, a smart watch or a smart glass), an electronic key, or the like can also be adopted.

The vehicle 200A includes various sensors (not shown) for detecting the state of the vehicle 200A. The vehicle 200A transmits the state of the vehicle 200A detected by these sensors to the mobile terminal 300A. The vehicle 200A transmits, for example, the current position (for example, longitude and latitude), state of charge (SOC), and grid connection state (plug-in state or plug-out state) to a vehicle agent 500 via the mobile terminal 300A. The SOC of the vehicle 200A means the SOC of the battery 230. The SOC indicates the remaining amount of electric power stored in the power storage device, and represents, for example, the ratio of the current power storage amount to the power storage amount in a fully charged state from 0% to 100%. In the present embodiment, when the vehicle 200A switches from the plug-out state to the plug-in state, the mobile terminal 300A requests the user to input the travel start time. Then, the mobile terminal 300A transmits the input travel start time to the vehicle agent 500.

In the present embodiment, the cloud server functions as the vehicle agent 500. The vehicle agent 500 is embodied by a processor (not shown) and a program executed by the processor. The vehicle agent 500 is provided on the cloud by cloud computing. The configuration of the vehicle agent 500 will be described later (see FIG. 6). In the power facility of the prosumer D1 shown in FIG. 4, each of the solar panel 110 (with the PCS 120), the power load 142, and the vehicle 200A corresponds to a resource.

Figure 5:
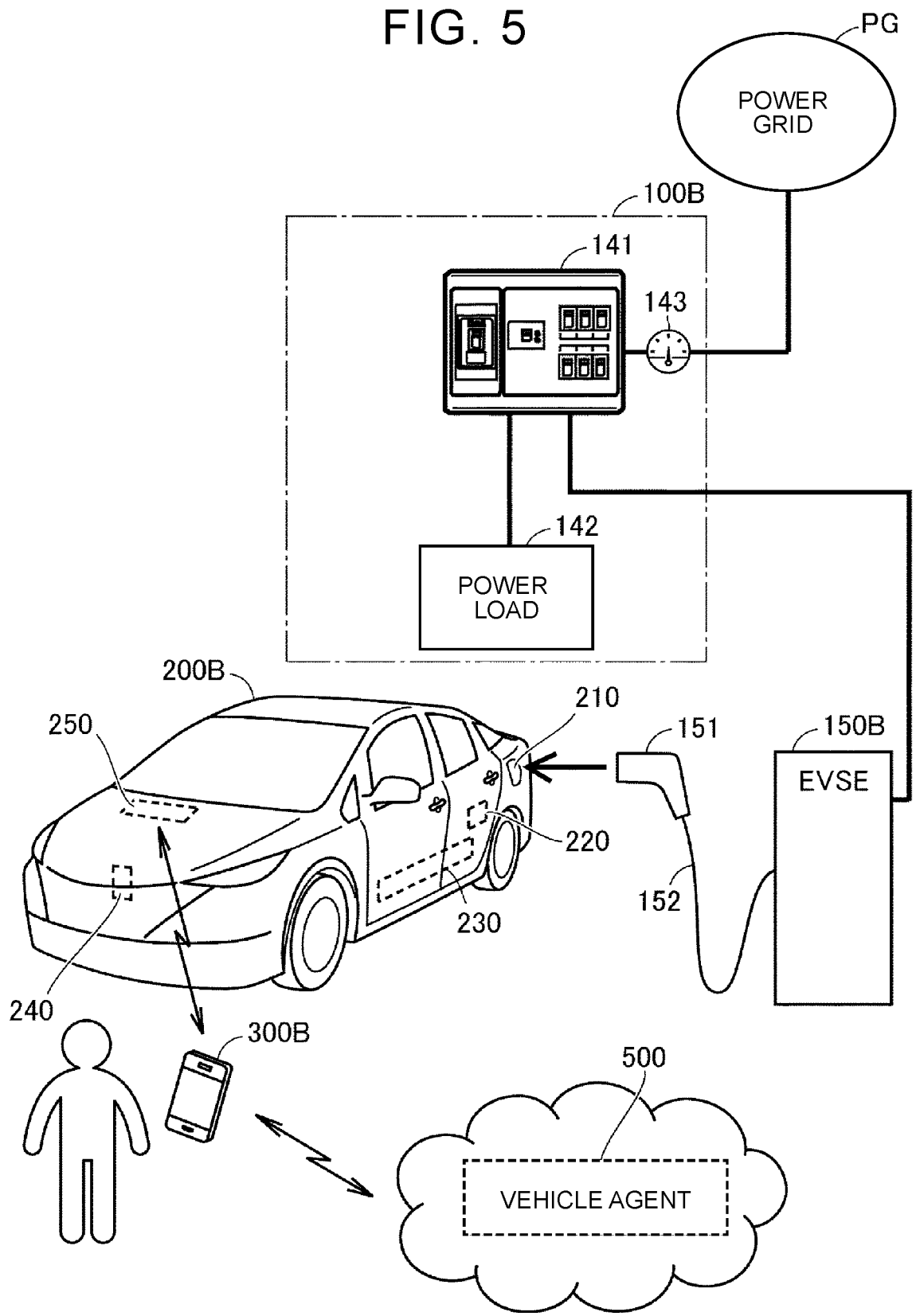
FIG. 5 is a diagram showing an example of a power facility of a consumer shown in FIG. 1.

FIG. 5 is a diagram showing an example of a power facility of the consumer D2. With reference to FIG. 5 together with FIG. 1, a house 100B has the same configuration as the house 100A shown in FIG. 4 except that the house 100B does not include the solar panel 110 and the PCS 120. The mobile terminal 300B has the same configuration as the mobile terminal 300A shown in FIG. 4. The vehicle 200B and the EVSE 150B also have basically the same configurations as the vehicle 200A and EVSE 150A shown in FIG. 4, respectively. However, the vehicle 200B is a V1G type BEV and does not have a V2H function.

For example, when a user who owns the vehicle concludes a predetermined contract with the aggregator, the aggregator registers the user in the power trading platform PF, and further, prepares the vehicle agent 500 for the user on the cloud. The vehicle agent 500 is prepared for each user who has signed the above contract with the aggregator. The vehicle agents 500 are managed separately for each user by a user identification (ID). In addition, the aggregator prepares a database on the cloud by cloud computing. In this database, the information on each user registered in the power trading platform PF is managed separately by the user ID. The user can use the vehicle agent 500 and the database in a cloud environment.

Figure 6:
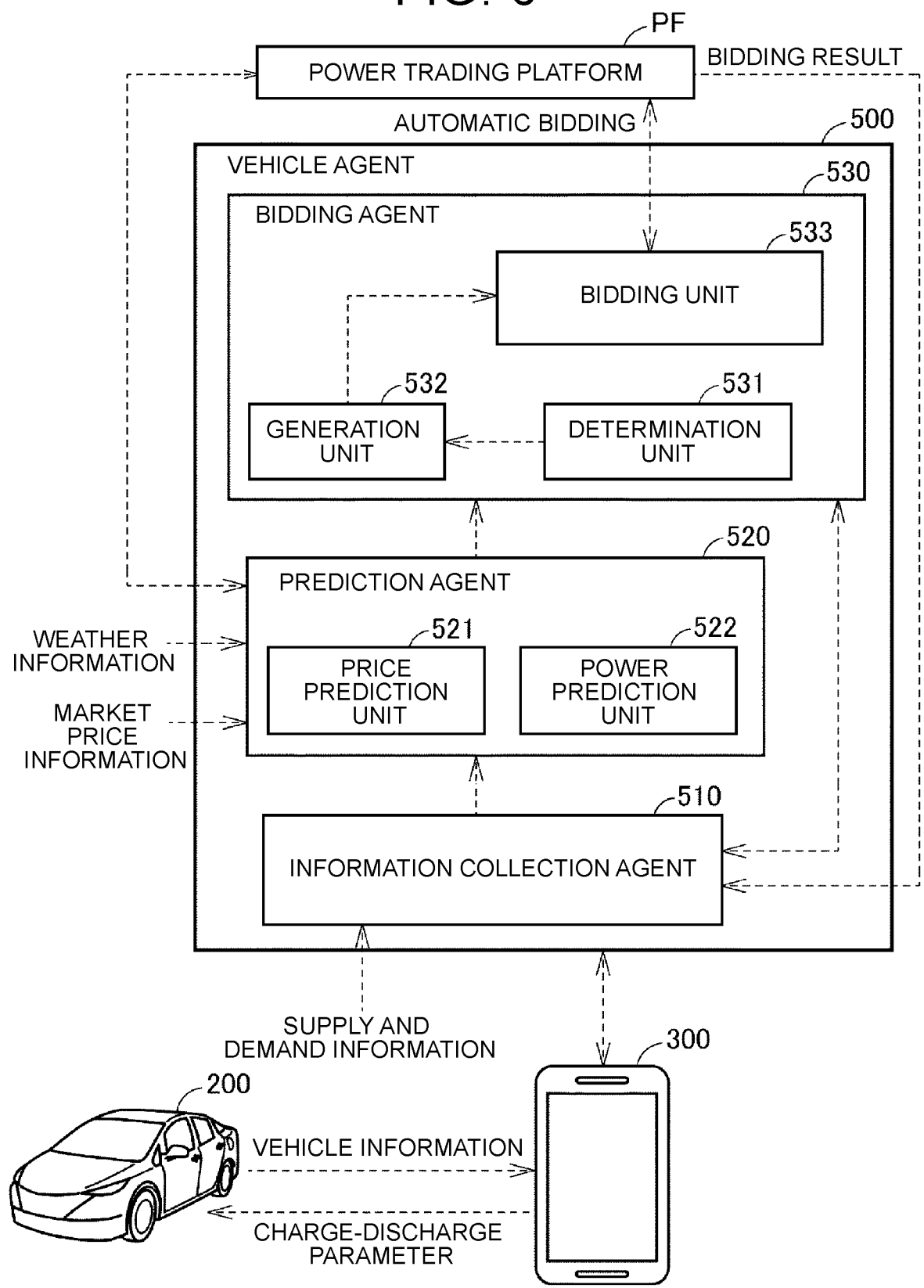
FIG. 6 is a diagram showing a detailed configuration of a vehicle agent (bidding computer) according to the embodiment of the present disclosure.

FIG. 6 is a diagram showing a detailed configuration of the vehicle agent 500. With reference to FIG. 6, the power trading system according to the present embodiment includes a cloud server functioning as the vehicle agent 500, the power trading platform PF, a vehicle 200, and a mobile terminal 300. The vehicle agent 500 corresponds to an example of a "bid computer" according to the present disclosure. The vehicle 200 is a vehicle owned by the user registered in the power trading platform PF, and has the same configuration as the vehicle 200A (FIG. 4) described above, for example. The mobile terminal 300 is a device carried by a user registered in the power trading platform PF, and has the same configuration as the mobile terminal 300A (FIG. 4) described above, for example.

Predetermined application software (hereinafter, simply referred to as an "application") is installed in the mobile terminal 300. The mobile terminal 300 can exchange information with the vehicle agent 500 through the above application. The user can operate the above application through, for example, the touch panel display of the mobile terminal 300. Further, the touch panel display of the mobile terminal 300 notifies the user of the information.

The vehicle agent 500 executes the process while accessing the database on the cloud. The database contains information on the user (for example, the specifications of the power facility shown in FIG. 4 or FIG. 5). The vehicle agent 500 includes an information collection agent 510, a prediction agent 520, and a bidding agent 530.

The information collection agent 510 is configured to acquire and store vehicle information on the vehicle 200 and user information on the user.

The information collection agent 510 sequentially receives the measured values of the above-mentioned power meter (for example, the smart meter 143 shown in FIG. 4 or FIG. 5). The information collection agent 510 acquires user information indicating a supply and demand status of the user (hereinafter, referred to as "supply and demand information") related to the power grid PG from the power meter of the user. Further, the information collection agent 510 acquires vehicle information (for example, the position, the SOC, the grid connection state, and the travel start time) from the mobile terminal 300.

The prediction agent 520 includes a price prediction unit 521 and a power prediction unit 522. The prediction agent 520 is configured to divide one day (for example, the next day) into predetermined time units and predict a power price, a power storage capacity, and required electric energy for each divided time slot. The predetermined time unit may be about 30 minutes, an hour or more and less than three hours, or three hours or more.

The price prediction unit 521 is configured to predict the power price (the sales price of the electric power) for each time slot in the power trading platform PF based on weather information (information indicating current or future weather conditions), market price information (information indicating power prices in the power market), and a trading status in the power trading platform PF. For example, the price prediction unit 521 can predict a variable renewable energy (VRE) power generation amount based on weather prediction data (weather, temperature, wind, etc.). As the VRE power generation amount increases, the power price tends to decrease.

The power prediction unit 522 is configured to predict the required electric energy for each time slot based on the supply and demand information acquired by the information collection agent 510. Specifically, the power prediction unit 522 predicts the power demand amount (power consumption) and the power generation amount for each time slot based on, for example, accumulated supply and demand history information (information indicating a past supply and demand status) and weather information (for example, weather forecast information), and calculates the required electric energy for each time slot based on the acquired prediction data. The required electric energy is calculated, for example, by subtracting the power generation amount from the power demand amount. As the power demand amount increases, the required electric energy increases. When the power generation amount exceeds the power demand amount, the power prediction unit 522 predicts the surplus electric energy instead of the required electric energy. The required electric energy is calculated, for example, by subtracting the power generation amount from the power demand amount.

The power prediction unit 522 is configured to predict the power storage capacity for each time slot based on the vehicle information acquired by the information collection agent 510. When the vehicle 200 is in the plug-in state, the power storage capacity is larger than when the vehicle 200 is in the plug-out state. The vehicle 200 in the plug-in state can store the electric power supplied from the power grid PG in the battery 230 (FIG. 4). As the SOC of the vehicle 200 in the plug-in state decreases, the power storage capacity increases. The power prediction unit 522 can predict the timing at which the vehicle 200 in the plug-in state enters the plug-out state (hereinafter, referred to as a "grid departure timing") based on the travel start time acquired by the information collection agent 510. Further, the power prediction unit 522 can predict the timing at which the vehicle 200 in the plug-out state enters the plug-in state (hereinafter, referred to as a "grid connection timing") based on the position and the SOC of the vehicle 200. In the present embodiment, the information collection agent 510 sequentially acquires the position and SOC of the vehicle 200. The mobile terminal 300 may request the user to input the travel end time indicating the grid connection timing, and may transmit the input travel end time to the vehicle agent 500. In the mode above, the power prediction unit 522 can predict the grid connection timing based on the travel end time.

The user purchases a shortage amount of the electric power (required electric energy) on the power trading platform PF. In addition, the user sells the surplus electric power (surplus electric energy) on the power trading platform PF. The bidding agent 530 places an automatic bid for power trading on behalf of the user. The bidding agent 530 places a bid in accordance with a predetermined bidding algorithm. The user can set bidding conditions in the bidding algorithm. Specifically, the bidding agent 530 places a bid on the power trading platform PF based on the information predicted by the prediction agent 520. The bidding agent 530 places a bid to purchase the required electric energy for each time slot based on the power price for each time slot and the power storage capacity for each time slot. Further, the bidding agent 530 places a bid to sell the required electric energy for each time slot based on the power price for each time slot and the power storage capacity for each time slot.

The bidding agent 530 basically places a bid such that the profit from purchasing and selling of electric power is large (or the power cost is reduced). However, when the bidding conditions are set by the user, the bidding agent 530 places a bid in accordance with the conditions. For example, when the target renewable energy ratio is set, the bidding agent 530 places a bid so as to achieve the target renewable energy ratio.

The power storage capacity allows (absorbs) a difference between a power supply timing and a power usage timing. As the power storage capacity increases, the degree of freedom in bidding becomes higher. For example, the bidding agent 530 can purchase and store the electric power to be used in the time slot when the power demand is high in advance in the time slot when the price is low. The mobile terminal 300 may transmit charge-discharge parameters (parameters related to charge-discharge control) to the vehicle 200 in accordance with the command from the vehicle agent 500. The ECU 250 (FIG. 4) may execute the charge-discharge control of the battery 230 in accordance with the command from the vehicle agent 500.

After the bidding agent 530 places a bid, a bidding result (a power trading result) is transmitted from the power trading platform PF to the information collection agent 510. For the contracted bid, a contracted bid tag (see FIG. 8 that will be described later) is transmitted from the power trading platform PF to the information collection agent 510. The contracted bid tags are stored in a database on the cloud. The power prediction unit 522 updates the required electric energy and the surplus electric energy in accordance with the power trading result. For example, when a part of the required electric energy is successfully purchased on the power trading platform PF, the power prediction unit 522 updates the required electric energy by subtracting the purchased electric energy from the required electric energy.

The bidding agent 530 includes a determination unit 531, a generation unit 532, and a bidding unit 533. The determination unit 531 determines whether to place a bid. In addition, the determination unit 531 determines whether to place a cancellation bid for canceling the contracted bid. The generation unit 532 generates the above-mentioned tag (bid data in a predetermined format) when the determination unit 531 determines that a bid is to be placed. Further, when the determination unit 531 determines that the cancellation bid is to be placed, the generation unit 532 transcribes the predetermined information (transcribed information) included in the contracted bid tag generates a cancellation bid tag. In the present embodiment, the bid ID (identification information of the contracted bid), the bidder ID (identification information of the bidder), the power delivery period, and the power attribute information (information indicating the attribute of electric power related to trading) are handled as the transcribed information. The bidding unit 533 places a bid for power trading by transmitting the tag generated by the generation unit 532 to the power trading platform PF. The bidding is executed in the above-described manner when the determination unit 531, the generation unit 532, and the bidding unit 533 operate in accordance with the bidding algorithm.

Figure 7:
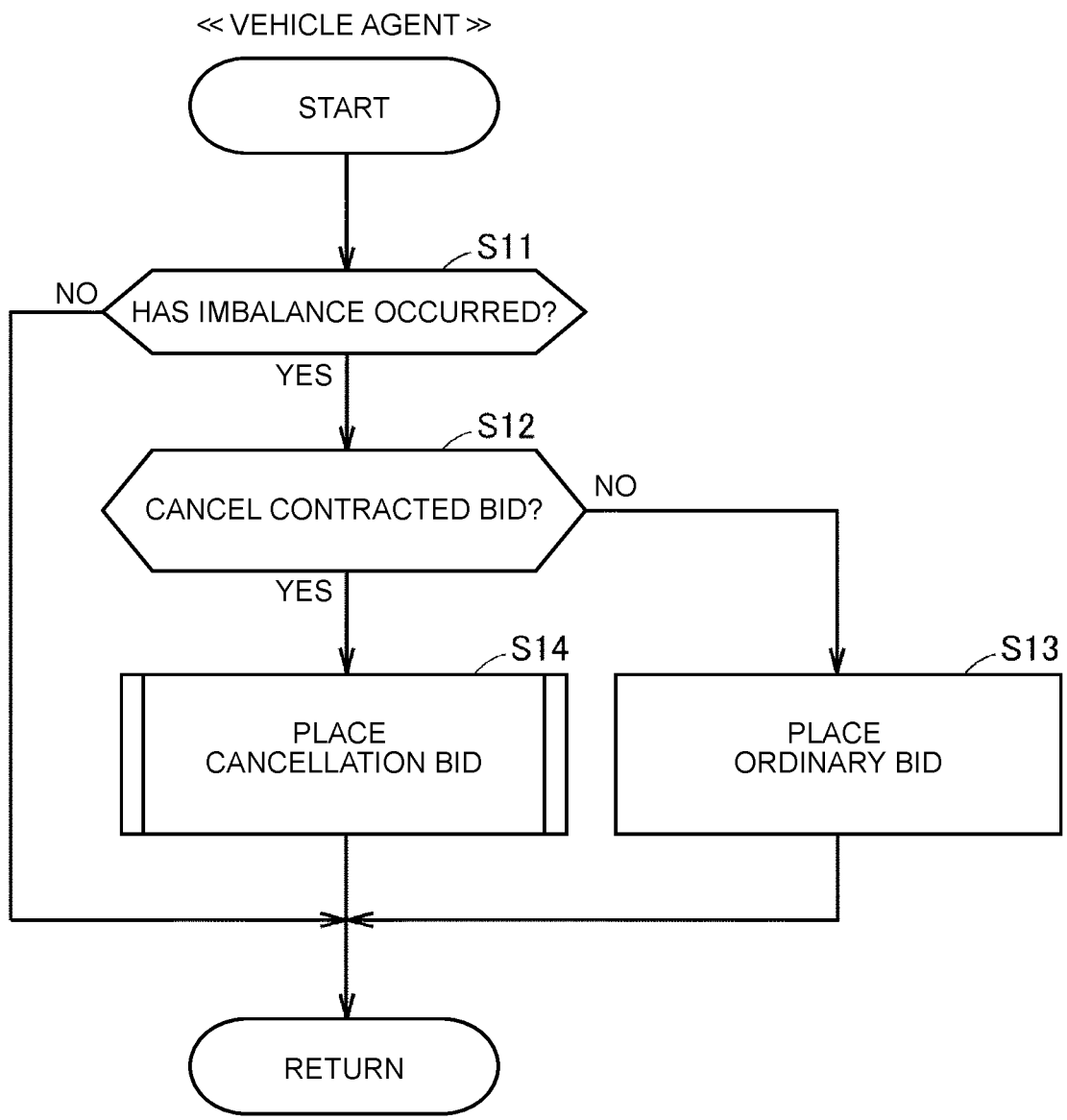
FIG. 7 is a flowchart showing a process related to bidding executed by the vehicle agent shown in FIG. 6.

FIG. 7 is a flowchart showing a process related to bidding executed by the vehicle agent 500. The process shown in this flowchart is repeatedly executed, for example, by the vehicle agent 500 of the prosumer D1 that owns the power facility equipment shown in FIG. 2. In this case, the vehicle 200A and the mobile terminal 300A shown in FIG. 4 function as the vehicle 200 and the mobile terminal 300 shown in FIG. 6, respectively. Hereinafter, each step in the flowchart is simply represented by "S".

With reference to FIG. 7 together with FIG. 6, in S11, the vehicle agent 500 monitors balancing related to the power grid PG. Specifically, the generation unit 532 determines in S11 whether imbalance in the balancing (a difference between the planned value and the actual supply and demand) is within a predetermined allowable range. When the imbalance exceeds the allowable range, (YES in S11), the process proceeds to S12. In the present embodiment, the demand power amount and the power generation amount for each time zone predicted by the power prediction unit 522 correspond to the planned values for each time zone. Further, the supply and demand information acquired by the information collection agent 510 indicates the actual supply and demand.

The determination in S11 corresponds to a determination as to whether to place a bid. A determination as YES in S11 (that is, an occurrence of the imbalance in the balancing) means that a bid is to be placed. A determination as NO in S11 means that no bid is to be placed. While the determination result is NO in S11, the determination in S11 is repeatedly executed.

In S12, the determination unit 531 determines whether to place a cancellation bid for canceling the contracted bid. For example, when it is predicted that the contracted bid cannot be fulfilled due to the occurrence of imbalance, YES is determined in S12, and the process proceeds to S14. On the other hand, when there is no contracted bid that cannot be fulfilled, NO is determined in S12, and the process proceeds to S13. In S13, the vehicle agent 500 places a normal bid (a new bid that is not a cancellation bid). Specifically, the generation unit 532 generates a bid tag for eliminating the imbalance in the balancing, and the bidding unit 533 transmits the generated tag to the power trading platform PF.

Figure 8:
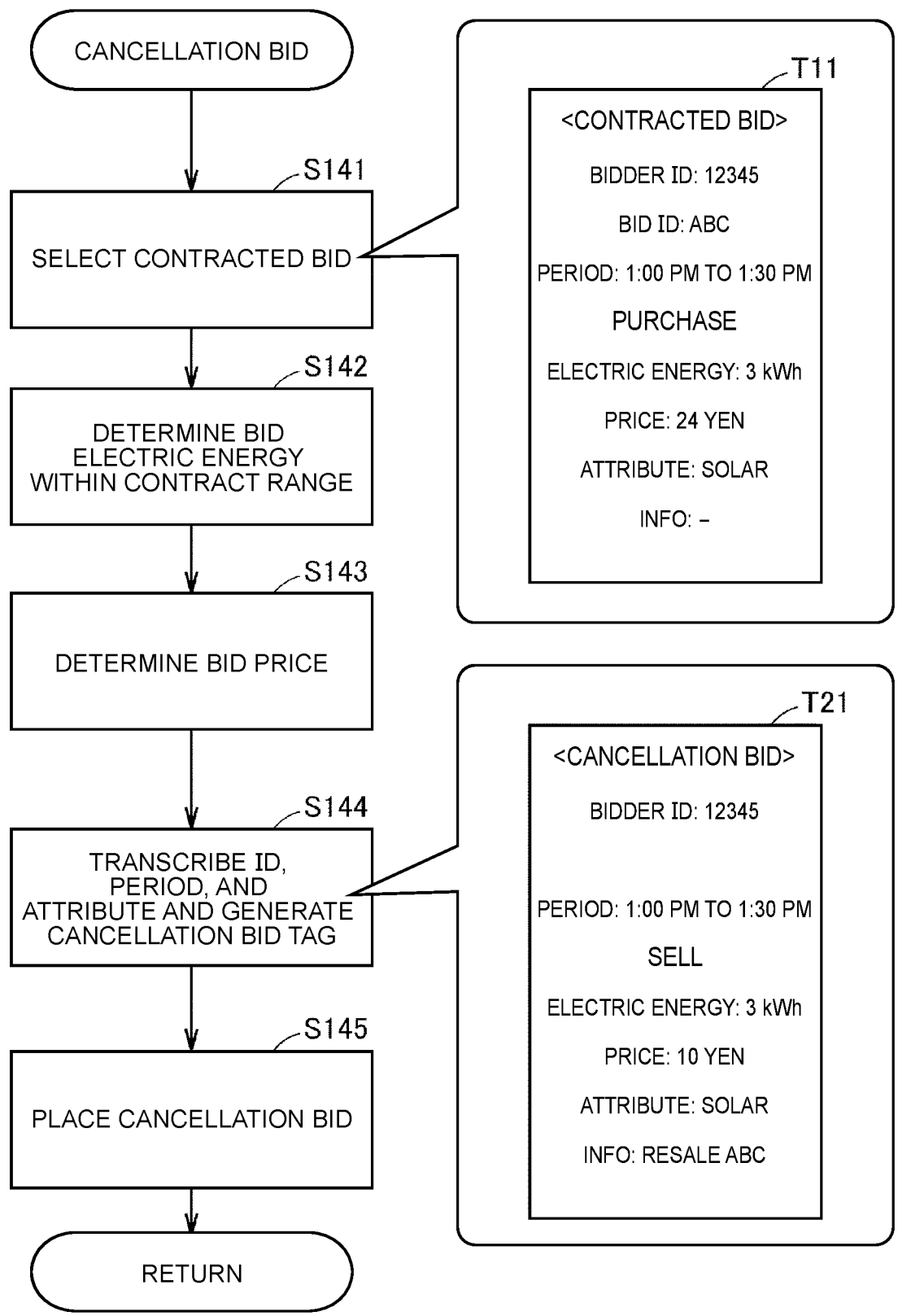
FIG. 8 is a flowchart showing details of a cancellation bid shown in FIG. 7.

In S14, a cancellation bid is executed. FIG. 8 is a flowchart showing the details in S14. With reference to FIG. 8 together with FIG. 6, in S141, the generation unit 532 selects the contracted bid to be canceled. For example, the generation unit 532 selects the contracted bid that is predicted to be unfulfillable. When the contracted bid selected in S141 is a purchase bid, the cancellation bid becomes a sell bid. When the contracted bid selected in S141 is a sell bid, the cancellation bid becomes a purchase bid. In one example, the contracted bid indicated by a tag T11 shown in FIG. 8 is selected in S141. The tag T11 is a purchase bid tag.

In the following S142, the generation unit 532 determines the bid electric energy of the cancellation bid. The generation unit 532 determines the bid electric energy of the cancellation bid within the range of the bid electric energy of the contracted bid selected in S141. For example, the generation unit 532 sets the portion of the bid electric energy of the contracted bid that cannot be fulfilled as the bid electric energy of the cancellation bid. However, the present disclosure is not limited to this, and the generation unit 532 may set the entire bid electric energy of the contracted bid including the electric energy that can be fulfilled as the bid electric energy of the cancellation bid. Further, the generation unit 532 may use the bid electric energy specified by the user as the bid electric energy of the cancellation bid. For example, in S142, the generation unit 532 may request the mobile terminal 300 for the bid electric energy. Then, the mobile terminal 300 may request the user to input the bid electric energy in accordance with the request from the generation unit 532, and may transmit the input bid electric energy to the vehicle agent 500.

In the following S143, a generation unit 532 determines the bid price of the cancellation bid. The generation unit 532 determines the price of the cancellation bid based on, for example, the bid price of the contracted bid selected in S141. When the cancellation bid is a sell bid, the generation unit 532 determines the bid price of the cancellation bid such that the bid price of the cancellation bid is lower than the bid price of the contracted bid. This facilitates successful resale. Further, when the cancellation bid is a purchase bid, the generation unit 532 determines the bid price of the cancellation bid such that the bid price of the cancellation bid is higher than the bid price of the contracted bid. This facilitates a successful repurchase.

The generation unit 532 may determine a price obtained by multiplying the bid price of the contracted bid by a predetermined magnification as the bid price of the cancellation bid. Further, the generation unit 532 may determine the bid price at which the bid can be surely contracted as the bid price of the cancellation bid based on the market price information. The generation unit 532 may determine a price obtained by multiplying the market price by a predetermined magnification as the bid price of the cancellation bid. Further, the generation unit 532 may use the bid price specified by the user as the bid price of the cancellation bid. For example, in S143, the generation unit 532 may request the mobile terminal 300 for the bid price. Then, the mobile terminal 300 may request the user to input the bid price in response to the request from the generation unit 532, and may transmit the input bid price to the vehicle agent 500.

In the following S144, the generation unit 532 describes the bid electric energy and the bid price determined in the above S142 and S143, and transcribes the transcribed information included in the contracted bid tag and generates the cancellation bid tag. The transcribed information is, for example, the bid ID, the bidder ID, the power delivery period, and the power attribute information. In one example, a cancellation bid tag T21 shown in FIG. 8 is generated by the process in S144. The tag T21 is a sell bid tag. As shown in FIG. 8, the bidder ID, the delivery period, and the attribute information match between the tag T11 and the tag T21. Further, the bid ID of the tag T11 is transcribed to the INFO of the tag T21 as information for specifying the bid to be resold.

FIG. 9 is a diagram showing a first modification of the contracted bid tag and the cancellation bid tag. With reference to FIG. 9, the tag T12 includes the benefit information (more specifically, the coupon information) in the INFO. The type of coupon may be identified by various symbols (letters, numbers, etc.). When the tag T12 is the contracted bid tag, the bid ID, the bidder ID, the power delivery period, the power attribute information, and the benefit information are transcribed to the tag T22 of the cancellation bid. The bid ID and the benefit information are transcribed in the INFO of the tag T22. Further, a description that the bid is the cancellation bid (more specifically, a bid for resale) is made in the INFO of the tag T22.

FIG. 10 is a diagram showing a second modification of the contracted bid tag and the cancellation bid tag. With reference to FIG. 10, a tag T13 is a sell bid tag. Even when the tag T13 is the contracted bid tag, the bid ID, the bidder ID, the power delivery period, and the power attribute information are transcribed to a tag T23 of the cancellation bid, similar to the case where the above-mentioned tag T11 (FIG. 8) is the contracted bid tag. Then, a description that the bid is the cancellation bid (more specifically, a bid for repurchase) is made in the INFO of the tag T23.

With reference to FIG. 8 again with reference to FIG. 6, after the process in S144, the bidding unit 533 places the cancellation bid by transmitting the cancellation bid tag (the tag generated in S144) to the power trading platform PF in S145. With the above, the cancellation bid (S14 in FIG. 7) is completed.

As described above, the power trading method according to the present embodiment includes data generation (S144 in FIG. 8) and placement of the cancellation bid (S145 in FIG. 8). In the data generation, the above-mentioned transcribed information included in the bid data for the contracted bid is transcribed to generate the bid data for the cancellation bid for canceling the contracted bid. In the cancellation bid, the bid data for the cancellation bid is transmitted to place a bid for power trading. In the power trading method above, it becomes possible to track the attributes of electric power in the cancellation bid as the transcribed information includes the attribute information.

In the vehicle agent 500 (bidding computer) according to the present embodiment, the generation unit 532 is configured to generate the bid data for the cancellation bid for eliminating the imbalance in the balancing. This makes it easier to eliminate the imbalance by the cancellation bid. Further, the generation unit 532 generates the bid data for the cancellation bid such that the bid electric energy of the cancellation bid does not exceed the bid electric energy of the contracted bid. This suppresses the bid electric energy of the cancellation bid from exceeding the bid electric energy of the contracted bid (that is, the upper limit of the bid electric energy that can be canceled). In the present embodiment, the process shown in FIG. 7 is executed by the agent (see FIG. 1) of each user registered in the power trading platform PF.

FIG. 11 is a flowchart showing a process related to power trading executed by the power trading platform PF according to the present embodiment. With reference to FIG. 11 together with FIG. 1, a power trading method according to the present embodiment includes bid examination (S1), matching (S2), power trading (S3), and recording and notification (S4). Respective processes in S1 to S4 are executed by the power trading platform PF (the power trading computer).

In S1, the power trading platform PF (more specifically, the bid examination mechanism) conducts the bid examination. In the bid examination, whether the tag (bid data) is created in a predetermined format is determined. Further, in the examination of the cancellation bid, requirements different from those of ordinary bids are examined.

Figure 12:
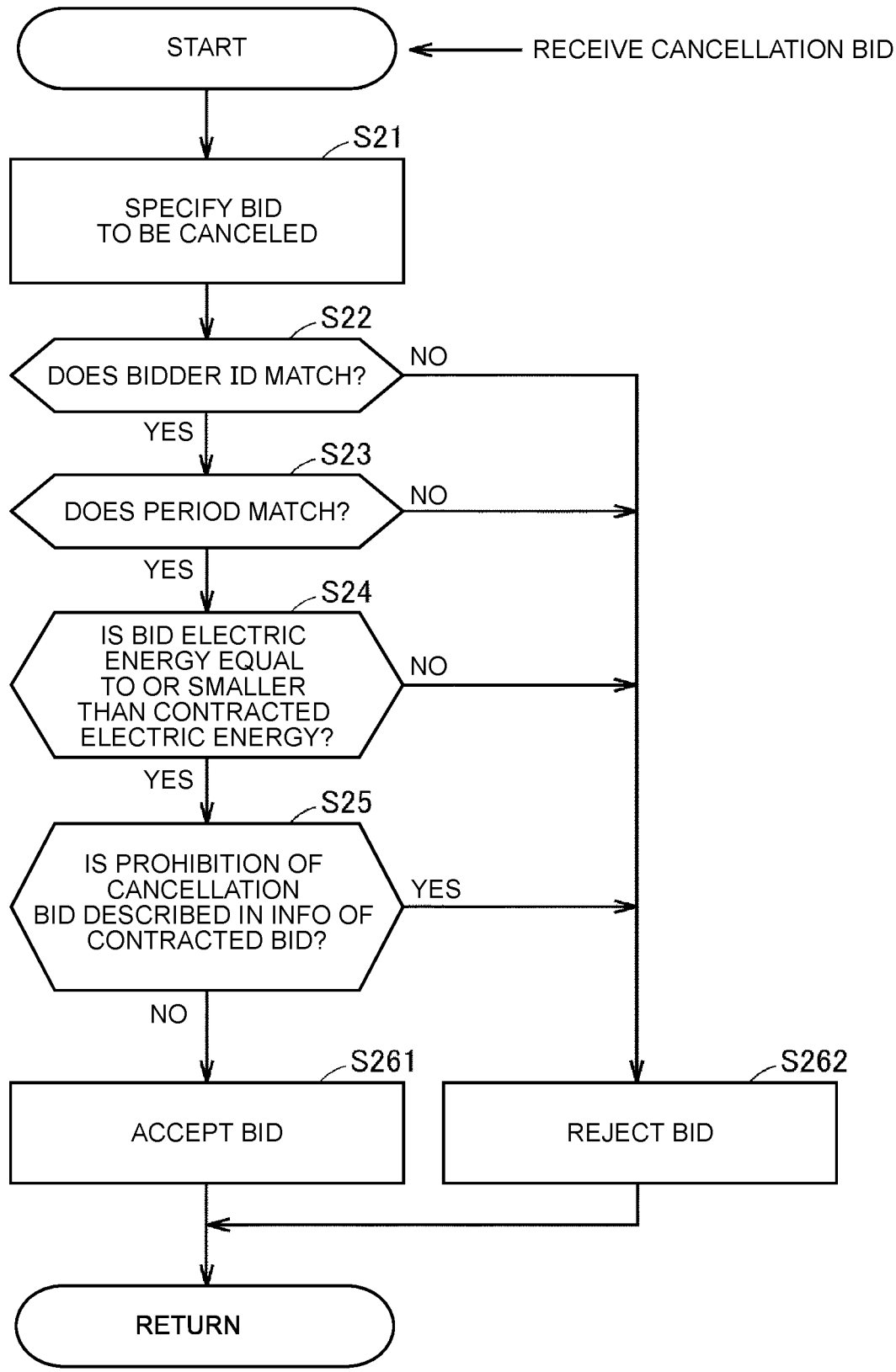
FIG. 12 is a flowchart showing a process related to an examination of the cancellation bid in the power trading shown in FIG. 11.

FIG. 12 is a flowchart showing a process related to the examination of the cancellation bid. With reference to FIG. 12 together with FIG. 1, in S21, the power trading platform PF specifies the contracted bid to be canceled based on the identification information (the bid ID) of the contracted bid described in the cancellation bid tag.

Subsequently, the power trading platform PF determines whether bid requirements A, B, C, and D are satisfied in S22, S23, S24, and S25, respectively. The bid requirement A is that the bidder of the contracted bid and the bidder of the cancellation bid match with each other. The bid requirement B is that the power delivery period is consistent between the contracted bid and the cancellation bid. The bid requirement C is that the bid electric energy of the cancellation bid does not exceed the bid electric energy of the contracted bid. The bid requirement D is that the cancellation bid is not prohibited with respect to the contracted bid.

When all of the bid requirements A to D are satisfied (YES in all of S22 to S25), the power trading platform PF determines in S261 that the bid is accepted. On the other hand, when any of the bid requirements A to D is not satisfied (NO in any of S22 to S25), the power trading platform PF determines in S262 that the bid is rejected.

With reference to FIG. 11 again together with FIG. 1, a notification of a bid examination result is transmitted to the user terminal (for example, the mobile terminal 300) or the agent (for example, the vehicle agent 500). The user who has been notified of the failure of the examination (bid refusal) may modify the tag and place a bid again.

When the bid examination is passed, the process proceeds to S2. In S2, the power trading platform PF (more specifically, the matching mechanism) performs matching based on the tags that have passed the examination. Then, when the matching is successful, the power trading platform PF (more specifically, the smart contract) executes the power trading based on both tags of which the matching is successful in S3. After that, the power trading platform PF records trading and issues a notification in S4. Specifically, a transaction of the power trading is recorded in the blockchain ledger based on the tag. Further, a notification of the contracted bid tag is transmitted from the power trading platform PF to each of the user terminal (for example, the mobile terminal 300) and the agent (for example, the vehicle agent 500).

As described above, when the power trading platform PF (the power trading computer) acquires the bid data from the agent of the user (the bidding computer), an examination as to whether to accept the bid is conducted (S1 in FIG. 11). The power trading platform PF accepts a bid when the acquired bid data satisfies predetermined requirements (the bid requirements A to D) in the examination relating to the cancellation bid (see FIG. 12). In the examination of the cancellation bid, a fraudulent cancellation bid (resale or repurchase) by anyone other than the person concerned (the bidder of the contracted bid) is rejected. Further, the cancellation bid (resale or repurchase) that exceeds the contracted range and the cancellation bid prohibited by the contracted bid are also rejected.

The above-mentioned predetermined requirements (requirements for accepting bids) are not limited to the bid requirements A to D, and can be changed as appropriate. For example, the bid requirement D (S25 in FIG. 12) may be omitted. Further, in the examination of the cancellation bid for resale, a condition that the bid price of the cancellation bid is equal to or lower than the bid price of the contracted bid may be added as the bid condition. These requirements may prohibit resale for profit.

In the prosumer D1 shown in FIG. 4, an in-vehicle battery is used as a power storage device for storing electric power generated by the solar panel 110 (solar power generation facility). However, the present disclosure is not limited to this, and the prosumer D1 (FIG. 1) may own a stationary power storage device as a power storage device for storing the electric power generated by the solar power generation facility.

In the above embodiment, the vehicle and the vehicle agent do not directly communicate with each other, and communicate with each other via the mobile terminal. However, the present disclosure is not limited to this mode. The vehicle may be equipped with a wireless communication device (for example, a data communication module (DCM)) that can access the mobile communication network (telematics), and may directly communicate with the vehicle agent wirelessly. The vehicle may also communicate with the vehicle agent via the EVSE.

In the above embodiment, the mobile terminal is adopted as the user terminal. However, the present disclosure is not limited to this, and any terminal belonging to the user can be adopted as the user terminal. For example, the user terminal may be an on-board terminal (for example, a navigation system).

In the above embodiment, an individual-owned vehicle (POV) is referred to. However, the present disclosure is not limited to this, and a Mobility as a Service (MaaS) vehicle may be adopted instead of the POV. The MaaS vehicle is a vehicle managed by a MaaS service provider.

The vehicle is not limited to a BEV not equipped with an internal combustion engine, and may be a plug-in hybrid electric vehicle (PHEV) equipped with an internal combustion engine. The vehicle is not limited to a passenger car, and may be a bus or a truck. The vehicle may be configured to be rechargeable in a non-contact manner. The vehicle may be configured to be able to perform autonomous driving or may be equipped with a flight function. The vehicle may be an unmanned vehicle (for example, a robotaxi, an automated guided vehicle (AGV), or an agricultural machine).

In the above embodiment, the vehicle agent is provided on the cloud. However, the present disclosure is not limited to this, and at least a part of the functions of the vehicle agent may be implemented in the on-premises server, the vehicle, or the mobile terminal.

The power grid PG is not limited to a large-scale AC grid, and may be a micro grid or a DC grid. The vehicle may be equipped with a charger or a charger-discharger for DC power.

The embodiments disclosed herein should be considered to be exemplary and not restrictive in all respects. The scope of the present disclosure is shown by the scope of claims rather than the description of the embodiments above, and is intended to include all modifications within the meaning and the scope equivalent to the scope of claims.

What is claimed is:

1. A power trading system comprising:
a power trading platform embodied by a program stored in a storage device, a server running the program, and a peer-to-peer network connecting the server and a group of computers to each other;
a vehicle including an electronic control unit (ECU) and a power storage device; and
a bidding computer that places a bid on the power trading platform, wherein:
the bidding computer includes a processor programmed to:
place a bid for power trading by transmitting bid data in a predetermined format to the power trading platform,
transcribe predetermined information included in the bid data for a contracted bid,
generate the bid data for a cancellation bid so as to cancel the contracted bid, and
issue a command related to electric power of the power trading;
the predetermined information includes attribute information indicating an attribute of the electric power of the power trading,
the attribute information includes a place of origin of the electric power, and
the ECU is configured to execute charge-discharge control of the power storage device in accordance with the command.

2. The power trading system according to claim 1, wherein:
the bid data in the predetermined format includes a bid price and a bid electric energy; and
the processor is programmed to generate the bid data for the cancellation bid such that the bid electric energy of the cancellation bid does not exceed the bid electric energy of the contracted bid.

3. The power trading system according to claim 2, wherein:
the contracted bid is a purchase bid, and the cancellation bid is a sell bid; and
the processor is programmed to generate the bid data for the cancellation bid such that the bid price of the cancellation bid is lower than the bid price of the contracted bid.

4. The power trading system according to claim 2, wherein:
the contracted bid is a sell bid, and the cancellation bid is a purchase bid; and
the processor is programmed to generate the bid data for the cancellation bid such that the bid price of the cancellation bid is higher than the bid price of the contracted bid.

5. The power trading system according to claim 1, wherein the predetermined information further includes identification information of the contracted bid, identification information of a bidder, and a power delivery period.

6. The power trading system according to claim 1, wherein the processor is programmed to generate the bid data for the cancellation bid so as to eliminate an imbalance in a balancing.

7. The power trading system according to claim 1, wherein:
the power trading platform is configured to conduct an examination as to whether to accept the bid when the bid data is acquired from the bidding computer;
the power trading platform is configured to accept the bid when the acquired bid data satisfies a predetermined requirement in the examination related to the cancellation bid; and
the predetermined requirement includes matching between a bidder of the contracted bid and a bidder of the cancellation bid.

8. The power trading system according to claim 7, wherein the predetermined requirement further includes that
a power delivery period matches between the contracted bid and the cancellation bid, and
a bid electric energy of the cancellation bid does not exceed a bid electric energy of the contracted bid.

9. A power trading system comprising:
an electronic control unit (ECU); and
a bidding computer that places a bid on a power trading platform, wherein:
the bidding computer includes a processor programmed to:
place a bid for power trading by transmitting bid data in a predetermined format to the power trading platform,
transcribe predetermined information included in the bid data for a contracted bid,
generate the bid data for a cancellation bid so as to cancel the contracted bid, and
issue a command related to electric power of the power trading;
the predetermined information includes attribute information indicating an attribute of the electric power of the power trading,
the attribute information includes a place of origin of the electric power, and
the ECU is configured to execute charge-discharge control of a power storage device in accordance with the command.

10. A power trading method comprising:
transcribing predetermined information included in bid data for a contracted bid;
generating bid data for a cancellation bid so as to cancel the contracted bid;
placing a bid for power trading by transmitting the bid data for the cancellation bid; and
issuing a command related to electric power of the power trading, wherein
the predetermined information includes attribute information indicating an attribute of the electric power of the power trading,
the attribute information includes a place of origin of the electric power, and
the method further comprises executing charge-discharge control of a power storage device in accordance with the command.

* * * * *

UNITED STATES PATENT AND TRADEMARK OFFICE
CERTIFICATE OF CORRECTION

| | | |
|---|---|---|
| PATENT NO. | : 12,020,316 B2 | |
| APPLICATION NO. | : 17/938189 | |
| DATED | : June 25, 2024 | |
| INVENTOR(S) | : Yuki Kudo et al. | |

It is certified that error appears in the above-identified patent and that said Letters Patent is hereby corrected as shown below:

On the Title Page

Item (30), the Foreign Application Priority Data has been omitted. Item (30) should read:
- (30) Foreign Application Priority Data
Oct. 19, 2021 (JP) ........................ 2021-170752 -

Signed and Sealed this
Third Day of September, 2024

Katherine Kelly Vidal
*Director of the United States Patent and Trademark Office*